United States Patent [19]

Patti

[11] Patent Number: 4,728,235
[45] Date of Patent: Mar. 1, 1988

[54] NON-ROTATABLE ATTACHMENT CLIP
[75] Inventor: Anthony J. Patti, Hayward, Calif.
[73] Assignee: Wheel Masters Inc., San Leandro, Calif.
[21] Appl. No.: 877,488
[22] Filed: Jun. 23, 1986
[51] Int. Cl.[4] .......................... F16B 37/02; F16B 21/18
[52] U.S. Cl. ..................................... 411/174; 411/523
[58] Field of Search ............. 301/37 R, 37 C, 37 CD, 301/37 S, 37 H, 37 TP, 9 DN; 24/535; 411/174, 175, 523, 524, 527

[56] References Cited
U.S. PATENT DOCUMENTS
2,378,684  6/1945  Carlstrom ........................ 411/527 X
2,672,905  3/1954  Hartman et al. .................... 411/175
4,408,939  10/1983 Graff et al. ...................... 411/174 X Primary Examiner—Robert B. Reeves
Assistant Examiner—Russell D. Stormer
Attorney, Agent, or Firm—Linval B. Castle

[57] ABSTRACT

A spring steel clip for connecting a first member to a second member is U-shaped with side tabs on one leg that is bent toward the inner surface of the other leg for limiting the amount the legs may be pressed together by a screw passing through holes in each leg and into an attached threaded nut. The screw may pass through a hole in a first member for connecting it to the edge of a second member to which the clip is clamped.

5 Claims, 4 Drawing Figures

NON-ROTATABLE ATTACHMENT CLIP

Cross-Reference to Related Applications

The clip disclosed herein is partially shown in connection with a truck wheel cover described and claimed in a co-pending patent application filed by the inventor herein and identified as "Vehicle Wheel Cover and Attachment", Ser. No.: 871363, filed: June 6, 1986.

BRIEF SUMMARY OF THE INVENTION

This invention relates generally to fasteners and in particular to a novel screw-tightened clip particularly adaptable for connecting one component to a surface at the edge of a second component. When being tightened, the clip cannot rotate nor can the two legs of the clip collapse from overtightening.

Clips and clamping devices are extensively used in mechanical assemblies for the connection of two or more components. Many clamping devices are termed "temporary" in that they temporarily connect components for welding of cementing and are readily removable for the components thereafter. Other types of clamping devices are intended to permanently connect parts and are usually tightened by screws or rivets.

In locations where it is difficult to attach clamping members, it is easier to employ one piece, U-shaped clips which may be applied to the component and then tightened by a screw which contracts the two legs of the clip. Unfortunately, in such difficult locations, the U-shaped clip may easily rotate with the tightening of the screw and fail to engage the component to which it is to be attached. Furthermore, overtightening of the clip can easily collapse the two legs of the clip and result in a weakening or even cracking of the material of the clip thus resulting in a possible complicated removal and replacement of the damaged clip.

The clip described herein is overcomes the above disadvantages of the U-shaped clip and cannot be accidentally rotated when installed nor can its legs be readily collapsed by the overtightening of its screw.

Briefly described, the clip is U-shaped and is tightened by a screw passing through the surface of both legs and into a threaded nut welded, riveted, or otherwise firmly attached to the exterior surface of the second leg. Small tabs are formed at both sides of one of the legs and are bent over to contact the other leg and to prevent leg collapse when the clip is fully tightened. The tabs also provide stops that prevent rotation of the clip so that there is no need for holding the clip against rotation as the screw is being tightened.

BRIEF DESCRIPTION OF THE DRAWINGS

In the drawings which illustrate the preferred embodiment of the invention.

DETAILED DESCRIPTION OF THE PREFERRED EMBODIMENT

Figure 1:
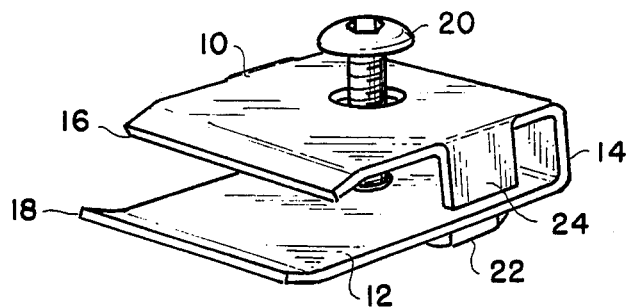
FIG. 1 is a perspective view illustrating the non-rotatable attachment clip of the invention.

As shown in FIG. 1, the non-rotatable attachment clip is formed of a single piece of metal strip, preferably a spring steel, and comprises a first leg 10 and second leg 12 interconnected into a generally U-shaped unit by a connecting leg 14. Both legs 10 and 12 are substantially equal in length and are preferably parallel. The exterior ends 16 and 18 of the legs 10 and 12, respectively, are preferably bent inward at an angle of approximately 10° to provide a grasping edge for the clip. A screw 20 passes through both surfaces of the legs and is threaded into a nut 22 attached to the exterior surface of the leg 12 as best illustrated in the bottom plan view of FIG. 4. Thus, a tightening of screw 20 causes the two arms 10 and 12 to close into a clamping action.

One of the legs of the clip, such as the leg 10, is formed with side tabs 24 which are bend approximately 90° toward the inner surface of the opposite leg. The length of the tabs bent toward the opposite leg should be somewhat less than that which would result in any failure of the material in the clip so that the tabs 24 may act as limit stops to prevent overtightening of the screw 20.

Figure 2:
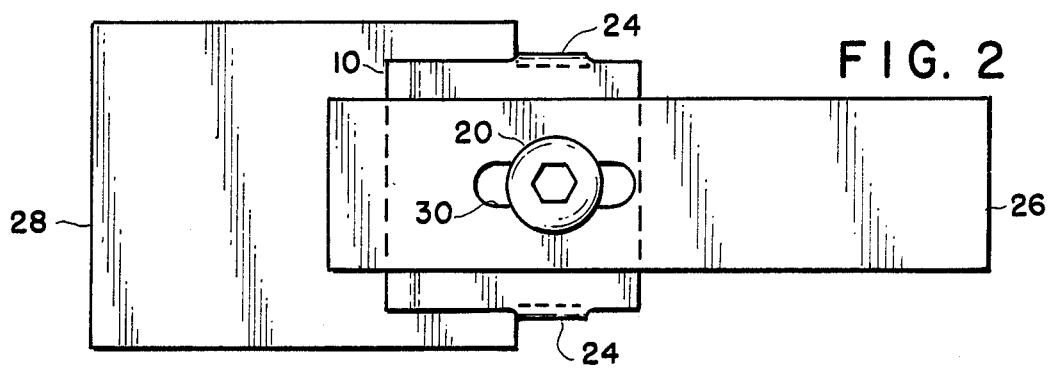
FIG. 2 is a plan view of the top of FIG. 1.
Figure 3:
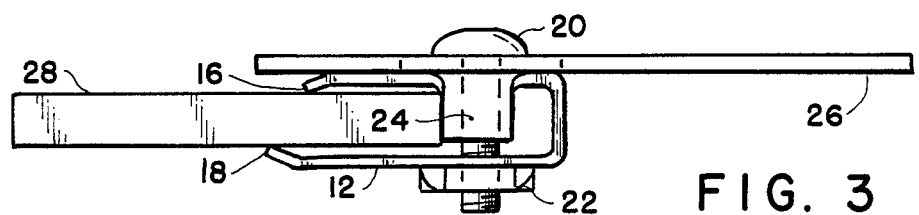
FIG. 3 is a side elevation view of the attachment clip.
Figure 4:
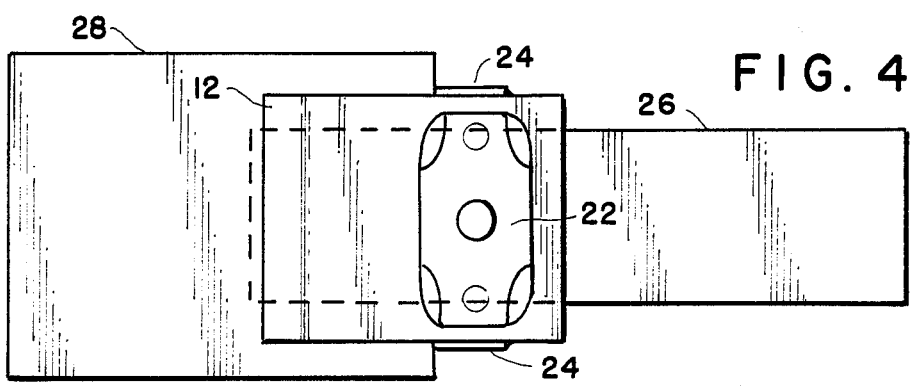
FIG. 4 is a bottom plan view of the clip.

FIGS. 2-4 illustrate the attachment clip in a typical use for interconnecting a thin component 26 to a thicker component 28. The clip may be thus used, for example, for attaching a thin ornamental wheel cover to the thicker material at the edge of a hand hole in a truck wheel, as described in the previously mentioned co-pending patent application. As thus used, the screw 20 is passed through a hole or slot 30 in thin material 26 and thence through the clip which is loosely engaged with the thicker component 28 with the edges of the bent tabs 24 against the edge of component 28. The screw 20 is then tightened so that the clip edges 16, 18 tightly engage the component 28. Because the bent tabs 24 are contacting the edge of the component 28, it is virtually impossible for the clip to be rotated from its position against the edge of the thicker component 28 as the screw is being tightened.

Having thus described my invention, what I claim is:

1. A clip for clamping a first component to the edge of a second component, said first component being attachable to the clip by a screw in said clip, said second component having no screw hole for attachment to said clip, said clip comprising:

first and second legs each interconnected at one end by a connecting leg to form a substantially U-shaped member, said first and second legs having exterior surfaces and facing interior surfaces spaced at distance substantially equal to the thickness of the second component;

side tabs extending from at least one of said first and second legs, said tabs being bent toward the inner surface of the other of said first and second legs and separated therefrom for limiting the minimum spacing between said first and second legs, said tabs being positionable to abut against the edge of said second component for preventing rotation of the clip;

a female threaded member connected to the exterior surface of said second leg, said threaded member being axially aligned with holes through the surfaces of said first and second legs; and a screw passing through said holes in said first and second legs and threaded into said female threaded member, the tightening of said screw operating to force together said first and second legs.

2. The clip claimed in claim 1 wherein said first and second legs are substantially equal in length.

3. The clip claimed in claim 2 wherein said first and second legs and said connecting leg are formed from a single piece of spring steel.

4. The clip claimed in claim 2 wherein the ends of said first and second legs opposite said connecting leg are bent toward each other to form grasping edges on said clip.

5. The clip claimed in claim 4 where said first and second leg ends are bent together at an angle of approximately 10° from the plane of said leg surfaces.

* * * * *